US008035866B2

(12) United States Patent  (10) Patent No.: US 8,035,866 B2
Sato  (45) Date of Patent: Oct. 11, 2011

(54) IMAGE READING DEVICE, COPY APPARATUS, AND IMAGE READING METHOD

(75) Inventor: Yuji Sato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1050 days.

(21) Appl. No.: 11/860,925

(22) Filed: Sep. 25, 2007

(65) Prior Publication Data

US 2008/0080023 A1  Apr. 3, 2008

(30) Foreign Application Priority Data

Sep. 28, 2006  (JP) .................................. 2006-263968

(51) Int. Cl.
*H04N 1/04* (2006.01)
(52) U.S. Cl. .......................... 358/451; 358/474; 358/406
(58) Field of Classification Search .................. 358/451, 358/474, 406; 382/47
See application file for complete search history.

(56) References Cited

U.S. PATENT DOCUMENTS 5,048,106 A * 9/1991 Nakajima et al. ............. 382/298
6,928,190 B2   8/2005 Namikata

FOREIGN PATENT DOCUMENTS

| JP | 64-69159 | * | 3/1989 |
| JP | 07-226839 | | 8/1995 |
| JP | 09-102057 | | 4/1997 |
| JP | 11-150655 A | | 6/1999 |
| JP | 2001-144937 A | | 5/2001 |
| JP | 2002-077609 | | 3/2002 |
| JP | 2004-112608 A | | 4/2004 |

OTHER PUBLICATIONS

JP Office Action dtd Jul. 27, 2010, JP Appln. 2006-263968, English translation.

* cited by examiner

*Primary Examiner* — Houshang Safaipour
(74) *Attorney, Agent, or Firm* — Banner & Witcoff, Ltd

(57) ABSTRACT

An image reading device of the present invention includes a reading means for reading a manuscript along a main-scanning direction as well as reading image information of the manuscript which relatively moves along a sub-scanning direction and a determination means for determining whether there is a specific image in the image information or not. The determination means makes determination by giving precedence to the center portion over end portions in the main-scanning direction in a reading range by the reading means.

18 Claims, 5 Drawing Sheets

IMAGE READING DEVICE, COPY APPARATUS, AND IMAGE READING METHOD

CROSS-REFERENCE TO RELATED APPLICATION

The present application alleges benefits related to Japanese Patent Application JP2006-263968 filed in the Japanese Patent Office on Sep. 28, 2006, the contents of which being incorporated herein by reference.

BACKGROUND OF THE INVENTION

The present invention relates to an image reading device, a copy apparatus and an image reading method.

A conventional image reading device includes a reading means for reading a manuscript along a main-scanning direction as well as reading image information of the manuscript which relatively moves along a sub-scanning direction, and a determination means for determining whether there is a specific image in the image information or not (for example, an image reading device disclosed in JP-A-2002-77609).

In the image reading device disclosed in JP-A-2002-77609, the determination means discriminates a specific image based on arrangement relation of marks. The means extracts marks included in image information, calculates distances between marks and determines that there is the specific image in the image information when the distances between marks correspond to distances in the specific image.

The conventional image reading device having such configuration is mounted on, or connected to a copy apparatus and the like having a printing means for performing printing based on image information. The image reading device is capable of, when determining that there is a specific image in image information, taking illegal copy prevention measures such as stopping image reading and the like. Accordingly, the image reading device discriminates a specific image included in a manuscript such as a banknote or a classified document and restricts reading of inappropriate reading of the image to prevent illegal copying.

In order to prevent the image reading device from being misused as illegal copies of a banknote or a classified document, it is preferable to improve determination accuracy of a determination means for determining whether image reading is inappropriate or not.

However, processing of discriminating the specific image included in a banknote or a classified document will be processing imposing large burden with the improve of the determination accuracy, therefore, there is a case that a long period of time is necessary for the determination processing. In this case, since it takes a long time to be determined by the determination means, there arises a problem that waiting time for a user will be long.

BRIEF SUMMARY OF THE INVENTION

The invention has been made in view of the above conventional conditions, and an object thereof is to provide an image reading device which is capable of confirming that illegal operation is performed at an early stage.

In order to solve the above problem, an inventor devoted himself to study and focused attention on the following point.

In the image reading device, when a user arranges a manuscript on the image reading device, he/she arranges the manuscript so that the manuscript (image) exists at the center portion in a reading range in a main-scanning direction in many cases, therefore, a manuscript such as a banknote or a classified document is also arranged so that the manuscript (image) exists at the center portion rather than end portions in the main-scanning direction in many cases. That is, the probability that the specific image as an object to be discriminated by the determination means exists at the center portion is high rather than end portions in the scanning direction.

The inventor have been reached the present invention based on the above point on which attention is focused.

A image reading device of the present invention includes a reading means for reading a manuscript in a main-scanning direction as well as reading image information of the manuscript which relatively moves along a sub-scanning direction, and a determination means for determining whether there is a specific image in the image information or not. The determination means makes determination by giving precedence to the center portion over end portions in the main-scanning direction in a reading range by the reading means.

The image reading device of the present invention having the above configuration makes determination by giving precedence to the center portion in which the probability that there is the specific image is high rather than end portions, therefore, even when a banknote or a classified document is improperly read, it is possible to determine that there is the specific image in image information at an earlier stage.

Therefore, the image reading device of the invention can confirm that an illegal operation is performed at an early stage. In this case, the device can take illegal copy prevention measures such as stopping image reading immediately or stopping transmission of image information to a copy apparatus and the like.

BRIEF DESCRIPTION OF THE DRAWINGS

Hereinafter, examples in which the present invention is embodied will be explained with reference to the drawings.

FIGS. 3A to 3F relate to the image reading device according to the embodiment, in which FIG. 3A to FIG. 3C are diagrams showing manuscript arrangement in test examples 1 to 3, and FIG. 3D to FIG. 3F are diagrams showing manuscript arrangement in comparative examples 1 to 3.

DETAILED DESCRIPTION OF THE PREFERRED EMBODIMENTS

Embodiment 1

Figure 1:
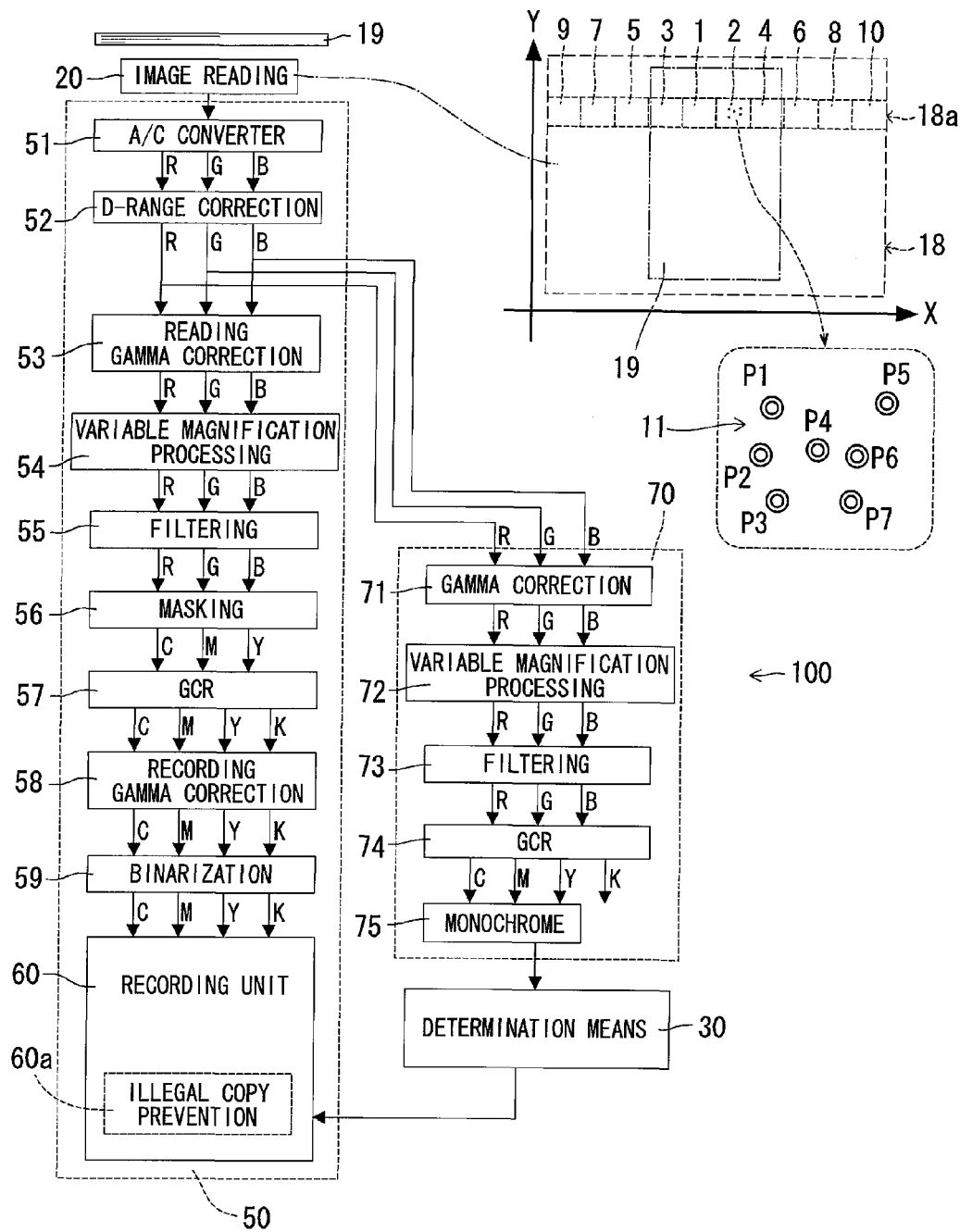
FIG. 1 is an explanatory diagram showing a configuration of an image reading device according to an embodiment.

As shown in FIG. 1, an image reading device 100 according to an embodiment is mounted on, or connected to a copy apparatus (not shown) such as a printer, a copy machine, FAX and the like. The image reading device 100 includes a reading means 20 for reading image information 18 from a manuscript 19 and a first image processing means 50 for correcting the image information 18 so as to correspond to a reading characteristic of the reading means 20, an output characteristic of a copy apparatus, or an output form such as an output size or a variable magnification rate of copying designated by a user.

The image reading device 100 also includes a second image processing means 70 and a determination means 30. The second image processing means 70 and the determination means 30 perform discrimination processing of whether there is a specific image 11 in the image information 18 or not according to a procedure described later.

The specific image 11 exists in the image information 18 obtained by the reading means 20 reading a manuscript 19 such as a banknote of a classified document. In the embodiment, the specific image 11 has seven marks P1, P2, P3, P4, P5, P6, and P7 arranged in a predetermined arrangement relation. Respective marks P1, P2, P3, P4, P5, P6, and P7 are marks "⊚" having the same shape, the color of which is also chromatic color so as not to be misidentified as character information.

Hereinafter, configurations of the reading means 20, the first image processing means 50, the second image processing means 70 and the determination means 30 will be explained in more detail.

(Reading Means)

The reading means 20 is a scanner reading the manuscript 19 in the main-scanning direction as well as reading image information 18 of the manuscript 19 which relatively moves in the sub-scanning direction. The reading means 20 may have any configuration as long as the means is capable of reading the image information 18 from the manuscript 19.

(First Image Processing Means)

The first image processing means 50 is provided in the downstream of the reading means 20, including, in order from the upstream, an A/D converter 51, a D-range correction unit 52, a reading gamma correction unit 53, a variable magnification processing unit 54, a filtering unit 55, a masking unit 56, a GCR unit 57, a recording gamma correction unit 58, a binarization unit 59 and a recording unit 60. The first image processing means 50 is not limited to the above configuration.

The A/D converter 51 converts the image information 18 read by the reading means 20 from analog signals to digital data. At this time, the signals are converted into digital data by dividing data into RGB (R: red, G: green, B: blue).

The D-range correction unit 52 corrects the unevenness of luminance of a light source included in the reading means 20 or the unevenness of dynamic ranges according to pixels occurring from the unevenness of sensitivity of a sensor.

The reading gamma correction unit 53 corrects contrast linearity of the reading means 20.

The variable magnification processing unit 54 performs variable magnification processing which enlarges or reduces the image information 18 in order to adjust the difference between resolutions of the reading means 20 and the recording unit 60 or in order to allow the variable magnification rate to be a rate designated by the user.

The filtering unit 55 performs smoothing filtering processing for removing noise of the image information 18 or enhanced filtering processing for improving accuracy of characters.

The masking unit 56 converts the difference of color spaces between the reading means 20 and the recording unit 60 (converting from RGB into CMY (C: cyan, M: magenta, Y: yellow). Recently, a method using a three-dimensional lookup table is commonly used.

The GCR unit 57 generates a black component from input CMY as well as removes the black component from CMY. Namely, CMY data is converted into CMYK (K: black) data.

The recording gamma correcting unit 58 corrects density linearity because of dot gain and the like of the recording unit 60.

The binarization unit 59 converts data into binary data which can be recorded in the recording unit 60 by an error diffusion method or a dither method.

The recording unit 60 records the image information 18 which has been corrected by the above A/D converter 51, the D-range correction unit 52, the reading gamma correction unit 53, the variable magnification processing unit 54, the filtering unit 55, the masking unit 56, the GCR unit 57, the recording gamma correction unit 58, and the binarization unit 59, and outputs the image information 18 to the copy apparatus and the like. The recording unit 60 includes an illegal copy prevention unit 60a performing illegal copy prevention measures such as stopping image reading or stopping transmission of image information 18 to the copy apparatus and the like, when it is determined that there is the specific image 11 in the image information 18.

(Second Image Processing Means)

The second image processing means 70 is provided in the downstream of the position of the D-range correction unit 52 of the first image processing means 50 and parallel to the position from the reading gamma correction unit 53 until the recording unit 60 in the first image processing means 50. The second image processing means 70 includes, in order from the upstream, a gamma correction unit 71, a variable magnification processing unit 72, a filtering unit 73, a GCR unit 74 and a monochrome unit 75.

The gamma correction unit 71 receives image information 18 in which dynamic ranges have been corrected by the A/D converter 51 and the D-range correction unit 52 in the first image processing means 50. The gamma correction unit 71 corrects contrast linearity of the reading means 20 so as to be suitable for discrimination processing of the specific image 11. Particularly, dark portions and highlight portions are not necessary for discrimination processing of the specific image 11, therefore, a high-contrast tone curve is used.

The magnification processing unit 72 performs variable magnification processing from the resolution of the reading means 20 to the resolution suitable for discrimination processing of the specific image 11. The variable magnification rate at this time does not depend on the variable magnification rate of copying designated by the user.

The filtering unit 73 performs filtering processing for removing noise of the image information 18 and for improving accuracy of characters. In the embodiment, since edge information is not used to discrimination processing of the specific information 11, the smoothing filtering processing for removing noise is performed with respect to the image information 18.

The GCR unit 74 generates a black component from input CMY as well as removes the black component from CMY. Namely, CMY data is converted into CMYK data.

The monochrome unit 75 receives only CMY data from the GCR unit 74, in which the black component is removed from the CMYK data. This is because the marks P1 to P7 included in the specific image 11 have a chromatic color so as not to be misidentified as character information. Then, the monochrome unit 75 allows the CMY data to be monochrome.

(Determination Means)

Figure 2:
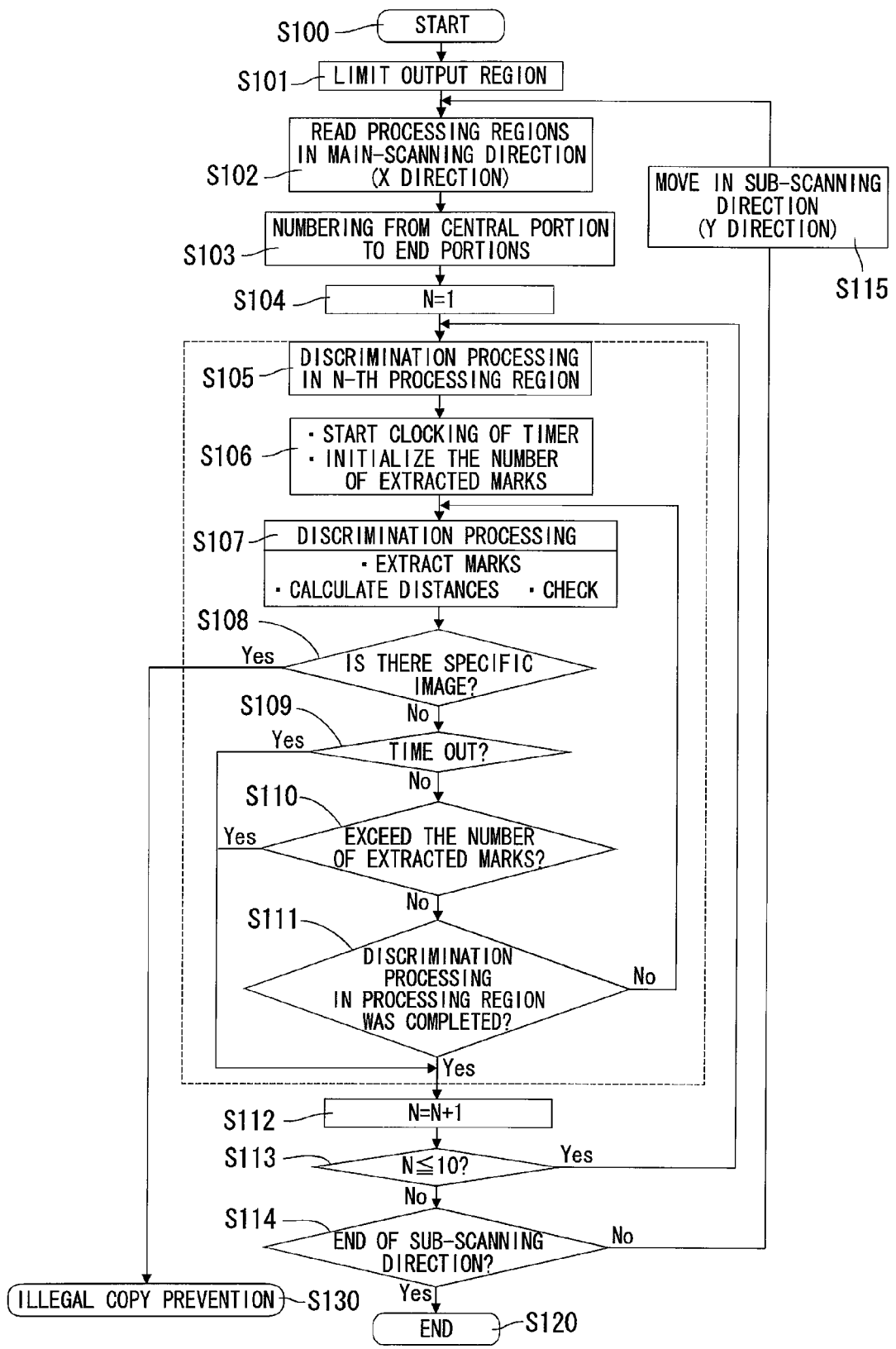
FIG. 2 relates to the image reading device according to the embodiment, which is a flowchart showing a processing method of a determination means.

The determination means 30 is provided in the downstream of the second image processing means 70. The determination means 30 includes Step S100 to S115, S120 and S130 as shown in FIG. 2. Hereinafter, the contents of respective steps will be explained.

First, in Step S100, discrimination processing of the specific image 11 by the determination means 30 is started. At this time, the main-scanning direction (X direction) and the sub-scanning direction (Y direction) are set at an initial position.

Next, in Step S101, a range in which discrimination processing is performed is limited in an output region determined based on the output size and/or magnification rate in the image information 18 of the manuscript 19. In the embodiment, a case in which discrimination processing is performed in the whole range of the image information 18 will be explained.

Next, in Step S102, as shown in FIG. 1, the image information 18 which is sequentially read by the reading means 20 is divided into many regions along the sub-scanning direction, and a belt-shaped extraction region 18a is sequentially extracted along the main-scanning direction. The extraction region 18a is divided into 10 along the main-scanning direction. Accordingly, 10 pieces of processing regions 1 to 10 are read in Step S102. The number of dividing the region in the main-scanning direction is 10 for convenience in order to make the explanation easy, however, the region can be divided into any number.

Next, in Step S103, 10 pieces of processing regions 1 to 10 will be numbered from the center portion to end portions in the main-scanning direction as shown in FIG. 1. Accordingly, the 10 pieces of processing regions 1 to 10 are numbered from the left-end side in the main-scanning direction such as "9, 7, 5, 3, 1, 2, 4, 6, 8, 10". According to such numbering, processing of Step S105 to Step S111 described later will be performed by giving preference to the center portion over end portions in the main-scanning direction.

Next, in Step S104, an initialization of a variable "n" (n=1) is performed, which is used for designating an n-th processing region "n".

Next, in Step S105, discrimination processing of the specific image in the n-th processing region "n" is started.

Next, in Step S106, clocking of a timer is started. The timer is for allowing the process to proceed to determination in a next processing region "n+1" when processing time in the determination in the n-th processing region "n" reaches the upper limit. In Step S106, the number of extracted marks is initialized. The number of extracted marks is for providing the upper limit to the number of marks determined in the n-th processing region "n".

Next, in Step S107, marks having the same shape and the same color as marks P1 to P7 are extracted from the n-th processing region "n". The determination means 30, when a mark is extracted, checks the shape and the color of the mark with marks P1 to P7 and calculates a correlation coefficient to calculate the similarity. Then, the similarity which will be a peak value partially at more than a fixed value is detected in calculated similarities. At this time, when the similarity which will be the peak value locally at the more than certain value is detected, it is considered that there is a mark in the image information 18, and a position where the similarity was calculated is determined as a position of the extracted mark. Every time the mark is extracted, the number of marks is added.

Next, the determination means 30 calculates distances between the extracted marks and checks distances between the marks with distances between the marks P1 to P7 of the specific image 11.

Step S107 does not proceed to next Step S108 after executing the discrimination processing in the n-th processing region "n" completely, but divides the discrimination processing into small sections and proceeds to next steps S108, S109, and S110. Then, determinations in Step S108, S109, and S110 are performed at each time. In Step S111, if the process is in the middle of discrimination processing, the process returns to Step S107 again and the discrimination processing is continued.

Next, in Step S108, when the distances between marks correspond to the distances between the marks P1 to P7 of the specific image 11, the determination means 30 determines that there is the specific image 11 in the image information 18.

In this case (case of Yes), it is not necessary to perform subsequent discrimination processing, and the determination means 30 proceeds to Step S130. In Step S130, discrimination processing by the determination means 30 is stopped, and the determination means 30 notifies that there is the specific image 11 in the image information 18 to the illegal copy prevention unit 60a of the recording unit 60. Accordingly, the illegal copy prevention unit 60a can take illegal copy prevention measures such as stopping reading the image immediately or stopping transmission of the image information 18 to the copy apparatus and the like.

On the other hand, in Step S108, when the distance between the marks does not correspond to the distances between the marks P1 to P7 of the specific image 11, the determination means 30 determines that the specific image 11 is not found in the image information 18 yet at that moment. In this case (case of No), the determination means 30 proceeds to Step S109.

Next, in Step S109, the determination means 30 checks passed time of the timer, and when processing time of the determination in the n-th processing region "n" reached the upper limit (case of Yes), proceeds to Step S112 and stops discrimination processing in the n-th processing region "n". On the other hand, when processing time of the determination in the n-th processing region "n" does not reach the upper limit (case of No), the determination means 30 proceeds to Step S110.

Next, in Step S110, the determination means 30 checks the number of extracted marks. When the number of extracted marks reaches the upper limit (case of Yes), the determination means 30 determines that the number of marks determined in the n-th processing region "n" reaches the upper limit, proceeds to Step S112 and stops the discrimination processing in the n-th processing region "n". On the other hand, when the number of extracted marks does not reach the upper limit (case of No), the determination means 30 proceeds to Step S111.

Next, in Step S111, the determination means 30 checks whether the discrimination processing in the n-th processing region "n" has been completed or not, and when the processing has not been completed (case of No), returns to Step S107 again and continues the discrimination processing. On the other hand, when the discrimination processing in the n-th processing region "n" has been completed (case of Yes), the determination means proceeds to Step S112.

Next, in Step S112, "1" is added to the variable "n" in order to proceed to discrimination processing in the "n+1"-th processing region "n+1".

Next, in Step S113, when the variable "n" is equal to or less than 10 (case of Yes), the determination means 30 determines that discrimination processing of a part of processing regions 1 to 10 in the extraction region 18a has not been completed, returns to Step S105 and repeats discrimination processing for the remaining part. On the other hand, when the variable "n" exceeds 10 (case of No), the determination means 30 determines that discrimination processing has been completed with respect to all processing regions 1 to 10 in the extraction region 18a and proceeds to Step S114.

Next, in Step S114, when the extraction region 18a does not reach the end of the sub-scanning direction (case of No), the determination means 30 proceeds to Step S115, and in Step S115, moves the extraction region 18a along the sub-scanning direction and returns to Step S102 to repeat discrimination processing.

On the other hand, in step S114, when the extraction region 18a reaches the end of the sub-scanning direction (case of Yes), the determination means 30 determines that discrimination processing has been completed with respect to the whole range of the image information 18 and proceeds to Step S120. In Step S120, the determination means 30 ends the processing and notifies that there is not the specific image 11 in the image information 18 to the recording unit 60.

As described above, the determination means 30 is capable of determining whether there is the specific image 11 in the image information 18 or not.

The image reading device 100 of the embodiment having the above configuration is capable of outputting image information 18 recorded in the recording unit 60 to outside. For example, a copy apparatus which received the image information 18 is capable of performing printing based on the image information 18 by a printing means. The image reading device 100 is also capable of discriminating the specific image 11 included in the image information 18 of the manuscript 19 such as a banknote or a classified document by the determination means 30, restraining the improper image reading and preventing illegal copying.

In the image reading device 100, the determination means 30 makes determination, giving precedence to the center portion over end portions in the main-scanning direction in Step S102 to S113. The probability that the specific image 11 exists at the center portion is high rather than end portions, therefore, even when the banknote or the classified document is read improperly, the image reading device 100 is capable of determining that there is the specific image 11 in the image information 18 at an earlier stage by determination in Step S108.

Therefore, the image reading device 100 of the embodiment can confirm that an illegal operation is performed at an earlier stage. The image reading device 100 can also take illegal copy prevention measures such as stopping image reading at an earlier stage or stopping transmission of the image information 18 to the copy apparatus and the like by the illegal copy prevention unit 60*a*.

In the image reading device 100, the determination means 30 sets the time limit in discrimination processing time in respective processing regions 1 to 10 by Step S109. The determination means 30 also sets the upper limit in the number of marks determined in the respective processing regions 1 to 10 by the Step S110. Therefore, it is not necessary that the image reading device 100 spends a long time in the determination in respective processing regions 1 to 10 until reaching a conclusion, therefore, it is possible to set time until the determination is completed within a desired period of time.

Moreover, the image reading device 100, the determination means 30 can determine whether there is the specific image 11 or not in the limited output region determined based on the output size and/or the magnification rate in the image information 18 of the manuscript 19 by Step S101. Accordingly, since the image reading device 100 does not perform the discrimination processing of the specific image 11 with respect to regions other than the output region, time for discrimination processing is not wasted.

Here, test examples 1 to 3 and comparative examples 1 to 3 (by simulation) are shown, which show that the image reading device 100 of the embodiment can determine that there is the specific image 11 in the image information 18 at an early stage. In this case, explanation will be made with reference to a case in which reading operation is performed in a situation that the manuscript 19 is overlapped with another manuscript (base sheet) as an example in which determination will be complicated. It is rare that the specific image is put at an end portion from a viewpoint of illegal prevention, therefore, simulation is performed assuming that whether there is the specific image 11 or not can be determined at the point that ¾, namely, 75% of the manuscript (one scanning) is read.

TABLE 1

Figure 3A:
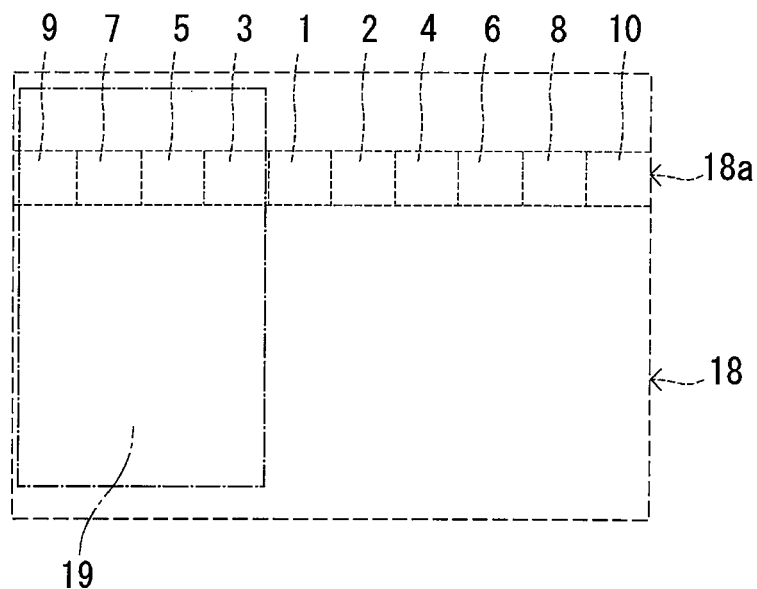
Figure 3B:
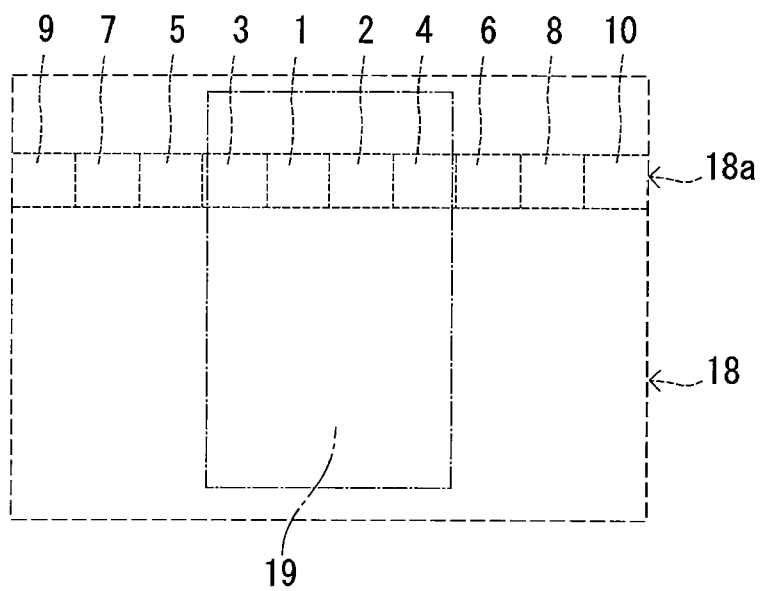
Figure 3C:
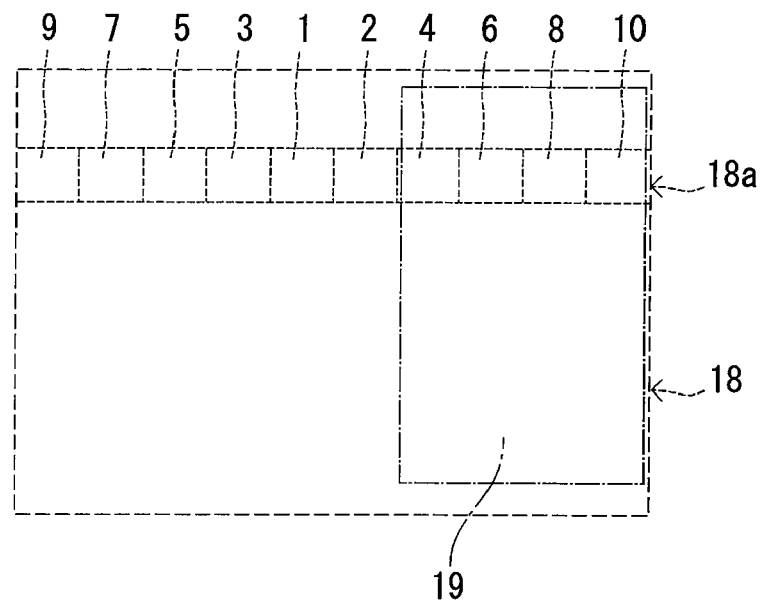
Figure 3D:
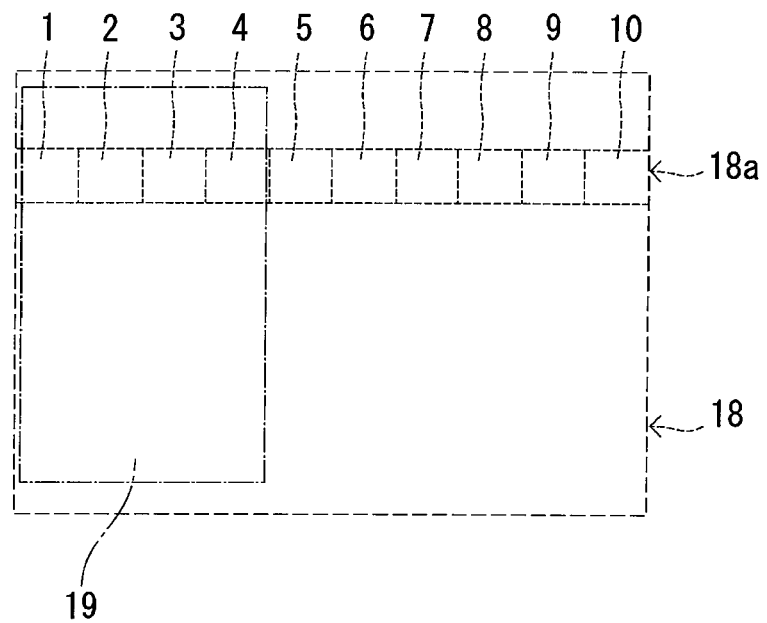
Figure 3E:
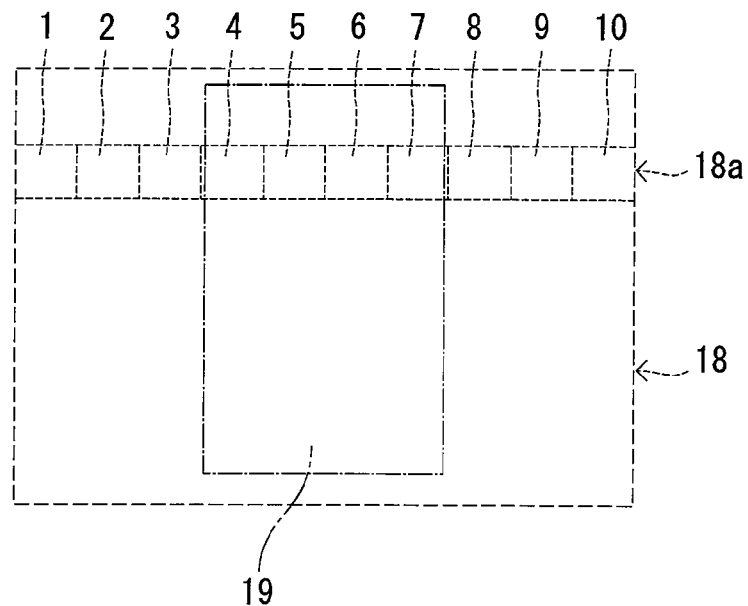
Figure 3F:
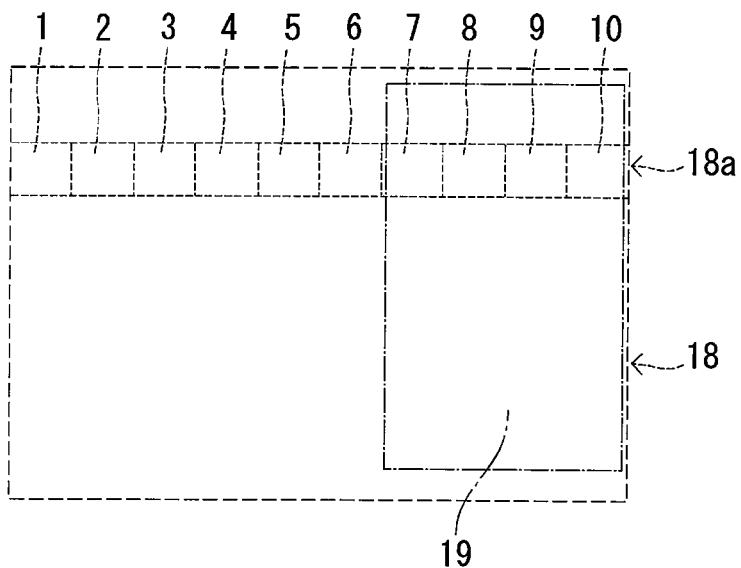

| [Test Example 1] In the case of processing from the center The case where the time for processing of the manuscript is 1 millisecond and the time for the processing of the base sheet is 1 millisecond | | | | [Comparative Example 1] In the case of processing from end portion The case where the time for processing of the manuscript is 1 millisecond and the time for the processing of the base sheet is 1 millisecond | | | |
|---|---|---|---|---|---|---|---|
| | Manuscript arrangement | | | | Manuscript arrangement | | |
| Elapsed time | At left-end portion FIG. 3A | At the center portion FIG. 3B | At right-end portion FIG. 3C | Elapsed time | At left-end portion FIG. 3D | At the center portion FIG. 3E | At right-end portion FIG. 3F |
| 1 msec | 1 | 1 | 1 | 1 msec | 1 | 1 | 1 |
| 2 msec | 2 | 2 | 2 | 2 msec | 2 | 2 | 2 |
| 3 msec | 3 | 3 | 3 | 3 msec | 3 | 3 | 3 |
| 4 msec | 4 | 4 | 4 | 4 msec | 4 | 4 | 4 |
| 5 msec | 5 | 5 | 5 | 5 msec | 5 | 5 | 5 |
| 6 msec | 6 | 6 | 6 | 6 msec | 6 | 6 | 6 |
| 7 msec | 7 | 7 | 7 | 7 msec | 7 | 7 | 7 |
| 8 msec | 8 | 8 | 8 | 8 msec | 8 | 8 | 8 |
| 9 msec | 9 | 9 | 9 | 9 msec | 9 | 9 | 9 |
| 10 msec | 10 | 10 | 10 | 10 msec | 10 | 10 | 10 |
| T (3/4) | 7 msec | 3 msec | 8 msec | T (3/4) | 3 msec | 6 msec | 9 msec |

Test Example 1

A test example 1 shown in Table 1 shows that the determination means 30 processes respective processing regions 1 to 10 in what order as well as shows time passed in the processing in the image reading device 100 of the embodiment 100.

In the test example 1, the manuscript 19 is arranged in three ways, that are, a case that the manuscript 19 is arranged at a left-end portion in the main-scanning direction as shown in FIG. 3A, a case arranged at the center portion in the main-scanning direction as shown in FIG. 3B, and a case arranged at a right-end portion in the main-scanning direction as shown in FIG. 3C.

Then, time necessary for discrimination processing in respective processing regions 1 to 10 from Step S105 to Step S111 is assumed to be 1 millisecond in the range in which the manuscript 19 is arranged, and even in the range of the base sheet in which the manuscript 19 is not arranged (another manuscript having an different image from the manuscript 19 is arranged), time is assumed to be 1 millisecond (time necessary for discrimination processing varies according to the degree of complication of the image). In Table 1, double-frames are put at the processing regions overlapping with the manuscript 19 (same in the following Tables 2 and 3).

As a result, in the central arrangement of the manuscript in the test example 1, discrimination processing with respect to the manuscript 19 is performed in processing regions 1 to 4 at the center portion in the main-scanning direction at an early stage. Here, when time in which ¾ of the discrimination processing of the processing regions 1 to 4 overlapping with the manuscript 19 has been finished is represented by T (¾), T(¾) was 3 milliseconds (shown by "←" in Table 1, same in the following Tables 2 and 3).

In the left-side arrangement of the manuscript in the test example 1, discrimination processing with respect to the manuscript 19 is performed in processing regions 3, 5, 7 and 9 at the left-end portion in the main-scanning direction. Time T(¾) in which ¾ of the discrimination processing of the processing regions 3, 5, 7 and 9 overlapping with the manuscript 19 has been finished was 7 milliseconds.

Furthermore, in the right-side arrangement of the manuscript in the test example 1, discrimination processing with respect to the manuscript 19 is performed in processing regions 4, 6, 8 and 10 at the right-end portion in the main-scanning direction. Time T(¾) in which ¾ of the discrimination processing of the processing regions 4, 6, 8 and 10 overlapping with the manuscript 19 has been finished was 8 milliseconds.

Comparative Example 1

A comparative example 1 shown in Table 1 is an example in which numbering of respective processing regions 1 to 10 is merely changed as shown in FIG. 3D to FIG. 3F. Specifically, numbering is performed in order from the left-end side, such as 1, 2, 3 . . . , 9, 10 in the main-scanning direction. Accordingly, in the comparative example 1, determination is performed by giving precedence to the-left end portion over the center portion and the right-end portion. Other conditions are the same as the test example 1.

As a result, in the comparative example 1, time T(¾) in which the determination processing has been finished is 6 milliseconds at the central arrangement of the manuscript, 3 milliseconds in the left-end arrangement of the manuscript and 9 milliseconds in the right-end arrangement. When comparing these results, the test example 1 won twice and lost once, and it is found the test example 1 is likely to discriminate that there is the specific image 11 in the image information 18 at earlier stage than the comparative example 1. The longest T(¾) in the test example 1 is 8 milliseconds at the right-end arrangement of the manuscript, and the longest T(¾) in the comparative example 1 is 9 milliseconds at the right-end arrangement of the manuscript. When comparing these results, it is found that the test example 1 discriminates that there is the specific image 11 in the image information 18 at earlier stage than the comparative example 1.

TABLE 2

| | [Test Example 2] In the case of processing from the center The case where the time for processing of the manuscript is 1 millisecond and the time for the processing of the base sheet is 2 millisecond | | | | [Comparative Example 2] In the case of processing from end portion The case where the time for processing of the manuscript is 1 millisecond and the time for the processing of the base sheet is 2 millisecond | | |
|---|---|---|---|---|---|---|---|
| | Manuscript arrangement | | | | Manuscript arrangement | | |
| Elapsed time | At left-end portion FIG. 3A | At the center portion FIG. 3B | At right-end portion FIG. 3C | Elapsed time | At left-end portion FIG. 3D | At the center portion FIG. 3E | At right-end portion FIG. 3F |
| 1 msec | 1 | 1 | 1 | 1 msec | 1 | 1 | 1 |
| 2 msec | 1 | 2 | 1 | 2 msec | 2 | 1 | 1 |
| 3 msec | 2 | 3 | 2 | 3 msec | 3 | 2 | 2 |
| 4 msec | 2 | 4 | 2 | 4 msec | 4 | 2 | 2 |
| 5 msec | 3 | 5 | 3 | 5 msec | 5 | 3 | 3 |
| 6 msec | 4 | 5 | 3 | 6 msec | 5 | 3 | 3 |
| 7 msec | 4 | 6 | 4 | 7 msec | 6 | 4 | 4 |
| 8 msec | 5 | 6 | 5 | 8 msec | 6 | 5 | 4 |
| 9 msec | 6 | 7 | 5 | 9 msec | 7 | 6 | 5 |
| 10 msec | 6 | 7 | 6 | 10 msec | 7 | 7 | 5 |
| 11 msec | 7 | 8 | 7 | 11 msec | 8 | 8 | 6 |
| 12 msec | 8 | 8 | 7 | 12 msec | 8 | 8 | 6 |
| 13 msec | 8 | 9 | 8 | 13 msec | 9 | 9 | 7 |
| 14 msec | 9 | 9 | 9 | 14 msec | 9 | 9 | 8 |
| 15 msec | 10 | 10 | 9 | 15 msec | 10 | 10 | 9 |
| 16 msec | 10 | 10 | 10 | 16 msec | 10 | 10 | 10 |
| T (3/4) | 11 msec | 3 msec | 13 msec | T (3/4) | 3 msec | 9 msec | 15 msec |

In a test example 2 and a comparative example 2 shown in Table 2, time necessary for discrimination processing in respective processing regions from Step S105 to Step S111 is assumed to be 1 millisecond in the range in which the manuscript 19 is arranged, and in the range of the base sheet in which the manuscript 19 is not arranged, time is assumed to be 2 milliseconds. The case is assumed in which another manuscript on which complicated patterns are printed as the base sheet is overlapped with the manuscript 19. Other conditions are the same as the test example 1 and the comparative example 1.

As a result, in the test example 2, time T(¾) in which discrimination processing has been finished is 3 milliseconds at the central arrangement of the manuscript, 11 milliseconds at the left-end arrangement of the manuscript and 13 milliseconds at the right-end arrangement of the manuscript. On the other hand, in the comparative example 2, time T(¾) in which discrimination processing has been finished is 9 milliseconds at the center arrangement of the manuscript, 3 milliseconds at left-end arrangement of the manuscript and 15 milliseconds at right-end arrangement of the manuscript.

When comparing these results with the test example 2, the test example 2 won twice and lost once, it is found that the test example 2 is likely to discriminate that there is the specific image 11 in the image information 18 at earlier stage than the comparative example 2. The longest T(¾) in the test example 2 is 13 milliseconds at the right-end arrangement of the manuscript, and the longest T(¾) in the comparative example 2 is 15 milliseconds at the right-end arrangement of the manuscript. When comparing these results, it is found that the test example 2 is likely to discriminate that there is the specific image 11 in the image information 18 at earlier stage than the comparative example 2.

nates that there is the specific image 11 in the image information 18 at earlier stage than the comparative example 3.

As described above, also according to the test examples 1 to 3 and the comparative examples 1 to 3, the image reading device 100 has the above operation and effect.

In the above description, the present invention has been explained according to the embodiment, and it goes without saying that the invention is not limited to the above embodiment but can be applied by being modified appropriately within the scope not deviated from the gist thereof.

The invention can be used for an image reading device and a copy apparatus.

TABLE 3

| | [Test Example 3] In the case of processing from the center The case where the time for processing of the manuscript is 2 millisecond and the time for the processing of the base sheet is 1 millisecond | | | | [Comparative Example 3] In the case of processing from end portion The case where the time for processing of the manuscript is 2 millisecond and the time for the processing of the base sheet is 1 millisecond | | |
|---|---|---|---|---|---|---|---|
| | Manuscript arrangement | | | | Manuscript arrangement | | |
| Elapsed time | At left-end portion FIG. 3A | At the center portion FIG. 3B | At right-end portion FIG. 3C | Elapsed time | At left-end portion FIG. 3D | At the center portion FIG. 3E | At right-end portion FIG. 3F |
| 1 msec | 1 | 1 | 1 | 1 msec | 1 | 1 | 1 |
| 2 msec | 2 | 1 | 2 | 2 msec | 1 | 2 | 2 |
| 3 msec | 3 | 2 | 3 | 3 msec | 2 | 3 | 3 |
| 4 msec | 3 | 2 | 4 | 4 msec | 2 | 4 | 4 |
| 5 msec | 4 | 3 | 4 | 5 msec | 3 | 4 | 5 |
| 6 msec | 5 | 3 | 5 | 6 msec | 3 | 5 | 6 |
| 7 msec | 5 | 4 | 6 | 7 msec | 4 | 5 | 7 |
| 8 msec | 6 | 4 | 6 | 8 msec | 4 | 6 | 7 |
| 9 msec | 7 | 5 | 7 | 9 msec | 5 | 6 | 8 |
| 10 msec | 7 | 6 | 8 | 10 msec | 6 | 7 | 8 |
| 11 msec | 8 | 7 | 8 | 11 msec | 7 | 7 | 9 |
| 12 msec | 9 | 8 | 9 | 12 msec | 8 | 8 | 9 |
| 13 msec | 9 | 9 | 10 | 13 msec | 9 | 9 | 10 |
| 14 msec | 10 | 10 | 10 | 14 msec | 10 | 10 | 10 |
| T (3/4) | 10 msec | 6 msec | 11 msec | T (3/4) | 6 msec | 9 msec | 12 msec |

In a test example 3 and a comparative example 3 shown in Table 3, time necessary for discrimination processing in respective processing regions from Step S105 to Step S111 is assumed to be 2 milliseconds in the range in which the manuscript 19 is arranged, and in the range of the base sheet in which the manuscript 19 is not arranged, time is assumed to be 1 millisecond. The case is assumed in which complicated patterns are printed on the manuscript 19 itself. Other conditions are the same as the test examples 1, 2 and the comparative examples 1, 2.

As a result, in the test example 3, time T(¾) in which discrimination processing has been finished is 6 milliseconds at the central arrangement of the manuscript, 10 milliseconds at the left-end arrangement of the manuscript and 11 milliseconds at the right-end arrangement of the manuscript. On the other hand, in the comparative example 3, time T(¾) in which discrimination processing has been finished is 9 milliseconds at the center arrangement of the manuscript, 6 milliseconds at left-end arrangement of the manuscript and 12 milliseconds at right-end arrangement of the manuscript. When comparing these results, the test example 3 won twice and lost once, it is found that the test example 3 is likely to discriminate that there is the specific image 11 in the image information 18 at earlier stage than the comparative example 3. The longest T(¾) in the test example 3 is 11 milliseconds at the right-end arrangement of the manuscript, and the longest T(¾) in the comparative example 3 is 12 milliseconds at the right-end arrangement of the manuscript. When comparing these results, it is found that the test example 3 discrimi-

What is claimed is:

1. An image reading device, comprising:
   a reader configured to read image information of a document in a main-scanning direction within a reading range of the reader as well as read the image information of the document along a sub-scanning direction within the reading range of the reader as the document moves relative to the reader along the sub-scanning direction; and
   a determination means configured to determine whether there is a specific image in the image information,
   wherein the reading range includes a center portion and end portions with respect to the main scanning direction,
   wherein determining whether there is the specific image in the image information, includes making a determination regarding image information at the center portion of the reading range prior to making a determination regarding image information at the end portions of the reading range.

2. The image reading device according to claim 1, wherein determining whether there is the specific image in the image information, includes dividing a processing region into plural processing regions in the main-scanning direction, and determining whether the specific image is in each processing region, and
   wherein, when a processing time reaches an upper limit during the determining of whether the specific image is in one processing region, the determination means is configured to proceeds to determination at a subsequent processing region.

3. The image reading device according to claim 1, wherein determining whether there is the specific image in the image information, includes dividing a processing region into plural processing regions in the main-scanning direction, and determining an arrangement of marks in the image information of one of the processing regions and whether the number of marks in the processing region is equal to or greater than a predetermined number.

4. The image reading device according to claim 1,
wherein determining whether there is the specific image in the image information, includes determining whether the specific image is in a limited output region based on at least one of an output size and a magnification rate in the image information of the document.

5. The image reading device according to claim 1, further comprising:
a first image processing means, including an A/D converter, a D-range correction unit, a reading gamma correction unit, a variable magnification processing unit, a filtering unit, a masking unit, a GCR unit, a recording gamma correction unit, a binarization unit, and a recording unit; and
a second image processing means, including, a gamma correction unit, a variable magnification processing unit, a filtering unit, a GCR unit and a monochrome unit.

6. A copy apparatus, comprising:
an image reading device including:
a reader configured to read image information of a document in a main-scanning direction within a reading range of the reader as well as read the image information of the document along a sub-scanning direction within the reading range of the reader as the document moves relative to the reader along the sub-scanning direction; and
a determination means configured to determine whether there is a specific image in image information; and
a printing means for performing printing based on the image information read by the reader,
wherein the reader is configured to read the document in a main-scanning direction and configured to read image information of the document which is arranged along a sub-scanning direction, and
wherein the reading range includes a center portion and end portions with respect to the main scanning direction,
wherein determining whether there is the specific image in the image information, includes making a determination regarding image information at the center portion of the reading range prior to making a determination regarding image information at the end portions of the reading range.

7. An image reading method, comprising the steps of:
reading image information of a document in a main-scanning direction within a reading range of the reader as well as reading the image information of the document along a sub-scanning direction within the reading range of the reader as the document moves relative to the reader along the sub-scanning direction; and
determining whether there is a specific image in the image information,
wherein the reading range includes a center portion and end portions with respect to the main scanning direction,
wherein determining whether there is the specific image in the image information, includes making a determination regarding image information at the center portion of the reading range prior to making a determination regarding image information at the end portions of the reading range.

8. The image reading method according to claim 7, wherein determining whether there is the specific image in the image information, includes dividing a processing region into plural processing regions and determining whether the specific image is in at least one of the processing regions.

9. The image reading method according to claim 8, wherein determining whether there is the specific image in the image information, includes determining whether the specific image is in at least one of the processing regions individually.

10. The image reading method according to claim 9, wherein the image information in a processing region which is positioned in the center portion of the reading range is evaluated prior to the image information in a processing region which is positioned in one of the end portions of the reading range.

11. The image reading method according to claim 9, wherein, when a processing time reaches an upper limit during the determining of whether the specific image is in one processing region, the determination means is configured to proceed to determination at a subsequent processing region.

12. The image reading method according to claim 7, wherein determining whether there is the specific image in the image information includes, extracting each of plural extraction regions defined by dividing the reading range along the sub-scanning direction, and dividing each of the extraction regions into plural processing regions in the main-scanning direction.

13. The image reading method according to claim 12, wherein the image information in a processing region which is positioned in the center portion of the reading range in the main-scanning direction is evaluated prior to the image information in a processing region which is positioned in one of the end portions of the reading range in the main-scanning direction.

14. The image reading method according to claim 13, wherein, after extracting one extraction region and determining whether the specific image is in the extraction region, a subsequent extraction region is extracted and it is determined whether the specific image is in the subsequent extraction region.

15. The image reading method according to claim 8, wherein determining whether the specific image is within the image information includes determining an arrangement of marks in the image information of one of the processing regions and whether the number of marks in the processing region is equal to or greater than a predetermined number.

16. The image reading method according to claim 7, wherein determining whether the specific image is in the image information, includes determining whether the specific image is in a defined output region based on at least one of an output size and a magnification rate of the image information.

17. The image reading device according to claim 1, wherein determining whether there is the specific image in the image information, includes dividing a processing region into plural processing regions and determining whether the specific image is in at least one of the processing regions.

18. The copy apparatus according to claim 6, wherein determining whether there is the specific image in the image information, includes dividing a processing region into plural processing regions and determining whether the specific image is in at least one of the processing regions.

* * * * *